March 24, 1936.  A. WANLESS  2,035,005
ARTIFICIAL FLY
Filed Dec. 13, 1934

Inventor
Alexander Wanless
By Pennie Davis Marvin & Edmonds
Attorneys

Patented Mar. 24, 1936

2,035,005

UNITED STATES PATENT OFFICE 2,035,005

ARTIFICIAL FLY

Alexander Wanless, Fordholm, Dunblane, Scotland

Application December 13, 1934, Serial No. 757,259
In Great Britain January 27, 1934

3 Claims. (Cl. 43—48)

This invention relates to artificial flies for use by anglers.

In a fly according to the invention the dressed body is built up upon a core threaded through the eye of the hook and provided with an eye for attachment to the gut.

I prefer to employ a treble hook for the larger types of flies.

The invention renders it possible to use a much finer gut cast or dropper than is ordinarily used for the same size of fly body and to make a much closer imitation of the natural fly.

The invention is illustrated in the accompanying drawing in which

Figure 1:
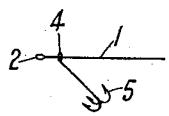
Fig. 1 is a diagrammatic view of the article in one stage of completion.
Figure 2:
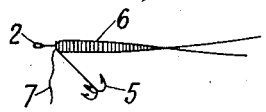
Fig. 2 is a diagrammatic view of the article in a further stage of completion.
Figure 3:
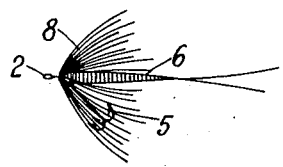
Fig. 3 is a diagrammatic view of the article in a further stage of completion.
Figure 4:
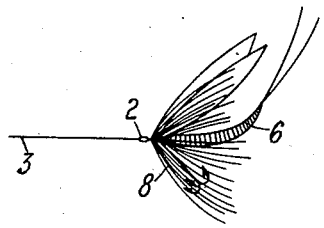
Fig. 4 is a diagrammatic view of the article in a further stage of completion.

The artificial fly shown comprises a thin flexible wire 1 (Fig. 1) of a length appropriate to the body length of the fly being imitated, and provided at one end with an eye 2 for attachment to a gut cast 3 (Fig. 4). The wire 1 is threaded through the eye 4 of a suitable hook 5, the eye 4 being so angled to the shank of the hook 5 that the shank will assume a predetermined angular setting with respect to the wire 1. The body dressing 6 of the fly is built up upon the wire 1 as foundation, and the eye 4 of the hook is bound by binding 7 (Fig. 2) to the front end of the body dressing 6.

Hackle 8 is then secured to the front end of the wire 1 in such wise as to conceal the hook 5, and the dressed body 6 is bent as required (Fig. 4).

The hook 5 may be single, double, or treble, as required.

By virtue of the improved construction it is possible to use a much finer gut cast or dropper than is ordinarily used for the same size of fly body. Furthermore, the hook is disposed at the optimum angle for engagement with the mouth of a fish and in such a manner as to be practically invisible to the fish. The hook is suspended at the waist of the fly, instead of protruding from the end of the abdomen as in the ordinary fly.

I claim:—

1. An artificial fly comprising a hook formed with an eye, a core member threaded through said eye and itself provided with an eye, and a body built up upon said core member.

2. An artificial fly comprising a hook formed with an eye, a core member threaded through said eye and itself provided with an eye, and a dressed body built up upon said core member and comprising a hackle serving to conceal the hook.

3. An artificial fly for anglers, comprising a filamentary dressed core provided with an eye, and a hook having a shank attached to, and disposed externally of, and obliquely to, said core rearwardly of said eye, so as to be suspended from the waist of the fly, said hook having at least one return bend substantially concealed by the dressing on said core, the rearward end of said core extending rearwardly beyond said bend.

ALEXANDER WANLESS.